US012211635B2

(12) United States Patent
Wang et al.

(10) Patent No.: US 12,211,635 B2
(45) Date of Patent: Jan. 28, 2025

(54) ARRANGEMENT TO COOL A COIL

(71) Applicant: HITACHI ENERGY LTD, Zürich (CH)

(72) Inventors: Yong Wang, Brilon (DE); Jens Tepper, Wolfenbüttel (DE); Jiahua Weng, Brilon (DE)

(73) Assignee: HITACHI ENERGY LTD, Zürich (CH)

( * ) Notice: Subject to any disclaimer, the term of this patent is extended or adjusted under 35 U.S.C. 154(b) by 638 days.

(21) Appl. No.: 17/438,424

(22) PCT Filed: Mar. 10, 2020

(86) PCT No.: PCT/EP2020/056393
§ 371 (c)(1),
(2) Date: Sep. 11, 2021

(87) PCT Pub. No.: WO2020/182835
PCT Pub. Date: Sep. 17, 2020

(65) Prior Publication Data

US 2022/0148786 A1 May 12, 2022

(30) Foreign Application Priority Data

Mar. 11, 2019 (EP) .................................... 19161817

(51) Int. Cl.
*H01F 27/08* (2006.01)
*H01F 27/02* (2006.01)
*H01F 27/06* (2006.01)

(52) U.S. Cl.
CPC ......... *H01F 27/085* (2013.01); *H01F 27/025* (2013.01); *H01F 27/06* (2013.01)

(58) Field of Classification Search
CPC ...... H01F 27/08; H01F 27/085; H01F 27/025; H01F 27/06; H01F 27/2876; H01F 27/322
(Continued)

(56) References Cited

U.S. PATENT DOCUMENTS 2,927,736 A 3/1960 Rohatyn
3,500,273 A 3/1970 Hoell
(Continued)

FOREIGN PATENT DOCUMENTS

CN 202282228 U * 6/2012
CN 102543394 A * 7/2012
(Continued)

OTHER PUBLICATIONS

Chinese Office Action Notification to Grant Patent Right for Invention, 202080019679.2, Mailed Oct. 10, 2022, 6 pages.
(Continued)

*Primary Examiner* — Shawki S Ismail
*Assistant Examiner* — Joselito S. Baisa
(74) *Attorney, Agent, or Firm* — Sage Patent Group

(57) ABSTRACT

An arrangement to cool a coil, comprising an enclosure, which at least partially incorporates or houses the coil, and a device to create an airflow to cool the coil, wherein the coil comprises at least one cooling channel to guide the airflow through the windings of the coil and an outer air duct lying radially in the outer circumference area of the coil or lying radially inside below an outer part of the coil, characterized in that an air guidance plate is placed at or near one longitudinal end of the outer air duct and/or of the coil to prevent bypasses of the airflow and/or to block at least partially the airflow through and/or along the outer air duct,
(Continued)

achieves the object to cool a coil, especially a coil of a transformer, in an efficient manner using space-saving means.

10 Claims, 4 Drawing Sheets

(58) Field of Classification Search
USPC ............................................................ 336/60
See application file for complete search history.

(56) References Cited

U.S. PATENT DOCUMENTS

| | | | | |
|---|---|---|---|---|
| 4,032,873 | A * | 6/1977 | Jallouk | H01F 27/085 336/59 |
| 8,049,587 | B2 * | 11/2011 | Israelsson Tampe | H01F 27/2876 336/59 |
| 9,024,713 | B1 | 5/2015 | Carlson | |
| 11,049,645 | B2 * | 6/2021 | Xu | H01F 27/085 |
| 2001/0052835 | A1 * | 12/2001 | Ito | H01F 27/322 336/57 |
| 2015/0109081 | A1 | 4/2015 | Patel | |
| 2015/0256061 | A1 | 9/2015 | Koji et al. | |
| 2016/0027568 | A1 | 1/2016 | Takauchi | |

FOREIGN PATENT DOCUMENTS

| | | | | |
|---|---|---|---|---|
| CN | 102779620 | A | 11/2012 | |
| CN | 102832015 | A | 12/2012 | |
| CN | 202855488 | U * | 4/2013 | |
| CN | 103578715 | A | 2/2014 | |
| CN | 203799788 | U * | 8/2014 | |
| CN | 106024298 | A | 10/2016 | |
| CN | 106205963 | A | 12/2016 | |
| CN | 108597762 | A | 9/2018 | |
| JP | 07057940 | A * | 3/1995 | |
| JP | 2000232022 | A | 8/2000 | |
| JP | 2002075749 | A * | 3/2002 | H01F 27/10 |
| JP | 4980187 | B2 | 7/2012 | |
| JP | 2016219688 | A | 12/2016 | |
| WO | WO-2020108869 | A1 * | 6/2020 | H01F 27/025 |

OTHER PUBLICATIONS

First Office Action for Chinese Patent Application No. 202080019679.2, mailed Jun. 6, 2022, 7 pages.

International Search Report and Written Opinion for International Application No. PCT/EP2020/056393 dated May 19, 2020, 20 pages.

* cited by examiner

ARRANGEMENT TO COOL A COIL

This application is a 35 U.S.C. § 371 national stage application of PCT International Application No. PCT/EP2020/0563 filed on Mar. 10, 2020, which in turns claims foreign priority to European Patent Application No. 19161817.2, filed on Mar. 11, 2019, the disclosures and content of which are incorporated by reference herein in their entirety.

TECHNICAL FIELD

The invention is related to an arrangement to cool a coil, comprising an enclosure, which at least partially incorporates or houses the coil, and a device to create an airflow to cool the coil, wherein the coil comprises at least one cooling channel to guide the airflow through the windings of the coil and an outer air duct lying radially in the outer circumference area of the coil or lying radially inside below an outer part of the coil.

BACKGROUND

It is known to cool the windings of a coil of a transformer by guiding air through its windings. Therefore an overpressure is generated by a fan at an air inlet area of an enclosure of the transformer. By this means an air flow is generated to flow from the inlet towards an outlet and then through a grid into the environment.

It is preferred that a large amount of air flows through cooling channels in the windings. This is generally achieved by using air guidance plates that are arranged in close proximity to the coils. By this means a flow resistance through the cooling channels becomes smaller than a flow resistance around the coils. This principle of the state of the art is schematically shown in FIG. 1. This principle involves some drawbacks. In order to ensure an airflow through the cooling channels, which is sufficient, an overpressure has to be generated to overcome the resistance in the enclosure.

This requires a large effort of operation and a ventilator having a high power. Such a ventilator implicates a large dimension and therefore lots of space is required for its installation. Further lots of air inefficiently flows through an outer air duct. This reduces the efficiency of cooling. To take measures, a sealing often is placed onto that surface of the coil, on which surface the air guidance plate is placed, so that there is no leak of airflow around the surface of the coil.

SUMMARY

The object of the invention therefore is to cool a coil, especially a coil of a transformer, in an efficient manner using space-saving means.

The object of the invention is achieved by means of the features of claim 1.

According to this claim an air guidance plate is placed at or near one longitudinal end of the outer air duct and/or of the coil to prevent bypasses of the airflow and/or to block at least partially the airflow through and/or along the outer air duct.

According to the invention it has been found that an air guidance plate has to be positioned in a way different from that of the state of the art. The present invention refers to a special positioning of at least one air guidance plate. According to the invention, by this positioning the outer air duct is blocked up to a desired degree, so that the air to cool flows mostly through the cooling channels of the windings. The result is a higher efficiency of cooling. Due to the increased efficiency of cooling, fans or ventilators with lower power may be used. The device to create an airflow may be compact and space-saving.

Advantageously the air guidance plate is placed at or near to the longitudinal end of the outer air duct and/or of the coil blocking at least partially or fully the airflow through the outer air duct, wherein at this longitudinal end a radially outer part of an insulation is shorter than a radially inner part of the insulation and/or wherein at this longitudinal end a radially outer barrier overhang is shorter than a radially inner barrier overhang. By shortening a part of an insulation or a barrier overhang, which is an insulation as well, it is possible to arrange the air guidance plate very near to the longitudinal end of the outer air duct. The air guidance plate is located longitudinally inside with respect to the longitudinal ends of a not shortened radially inner barrier overhang or a not shortened radially inner part of the insulation.

Further advantageously, the radially outer part of the insulation is shortened relative to the radially inner part of the insulation, wherein the insulation surrounds the at least one cooling channel or cooling channels and wherein the air guidance plate is arranged longitudinally inside with respect to the longitudinal end of the radially inner part. So the air guidance plate is arranged at least flush or aligned with the longitudinal end of the radially inner part of the insulation and does not exceed the longitudinal end of this radially inner part.

Advantageously, at least one first barrier overhang, which lies radially outside with respect to the at least one cooling channel or cooling channels is shortened relative to a further barrier overhang which lies radially inside with respect to the first barrier overhang. So the air guidance plate is arranged at least flush or aligned with the longitudinal end of the not shortened barrier overhang or barrier overhangs and does not exceed the longitudinal end of this not shortened barrier overhang.

Further advantageously, the outer air duct has a width of slit in the range between 30 to 40 mm and wherein a cooling channel between two windings has a width of slit in the range between 7 to 10 mm. The air flow is urged to flow through the more narrow or tight cooling channel or cooling channels by the air guidance plate, which blocks the wider outer air duct at least partially or fully.

Advantageously, between the air guidance plate and the longitudinal end of the outer air duct there is a longitudinally oriented air gap having a width in the range between 10 to 30 mm. Through this some dust particles may pass and can not block the air gap.

Further advantageously, the air guidance plate abuts with one end on the radially inner part of the insulation without any radially oriented air gap. Through this, the outer air duct is blocked at least partially in a very effective manner and further sealings are not necessary.

Advantageously the air guidance plate is fixed at one end or at one rim on the enclosure and extends with the other end or another rim to the coil. By this means sealings on the coil and/or on the enclosure and the corresponding labor for assembling them are eliminated. Further the flow resistance through the cooling channels becomes smaller than the flow resistance outside of the coil.

Further advantageously the air guidance plate is placed, preferably directly, onto the lower part of the high-voltage side of the coil. The high-voltage side is the side of the high-voltage winding of a coil of a transformer. The lower part is stressed less with respect to dielectric stresses. Insofar the lower part may also be called the cold part of the coil.

The high-voltage winding is earthed or grounded on one side, namely on the cold part. Therefore the air guidance plate may be arranged easily and directly to the cold part of the high-voltage winding. By this means the flow resistance through the cooling channels becomes smaller than the flow resistance outside of the coil. Further the outer air duct lying radially inside below the outer surface of the coil can be blocked up to a desired degree, so that the airflow through the cooling channels in the windings becomes more efficient.

Advantageously, there is at least one air gap between the air guidance plate and the high-voltage side of the coil. By this means no sealing has to be used on the surface of the coil. Costs for the sealing can be saved. Further the outer air duct lying radially inside below the outer surface of the coil can be blocked up to a desired degree in such a manner, that the airflow through the cooling channels in the windings becomes more efficient. The dimensional tolerance of the tailored air guidance plate is larger, because an air gap is allowed or desired between a surface of the coil and an air guidance plate. A small air gap between the coil and the air guidance plate also allows the flow of dust through the outer air duct.

Further advantageously, even a part of the insulation of the lower part of the coil is shortened to place the air guidance plate. By shortening longitudinally even a part of the insulation on the lower side of the coil, the air guidance plate can be placed directly on the high-voltage side of the coil.

The enclosure as described above preferably is the enclosure of a transformer, wherein several coils are housed in the enclosure. The device to create an airflow may be positioned besides and/or outside of the enclosure or within the enclosure.

Therefore, a transformer preferably comprises the arrangement as described above. The transformer may be enclosed in the enclosure with forced air cooling. The transformer may comprise several coils, especially three coils. Each coil is equipped with one or more air guidance plate as described above.

The transformer preferably is a dry-type transformer or a traction transformer. Especially the transformer is a dry-type transformer for rolling stock applications. The transformer preferably is used in a train. The dry-type transformer is in an enclosure with forced air cooling.

DESCRIPTION

Figure 1:
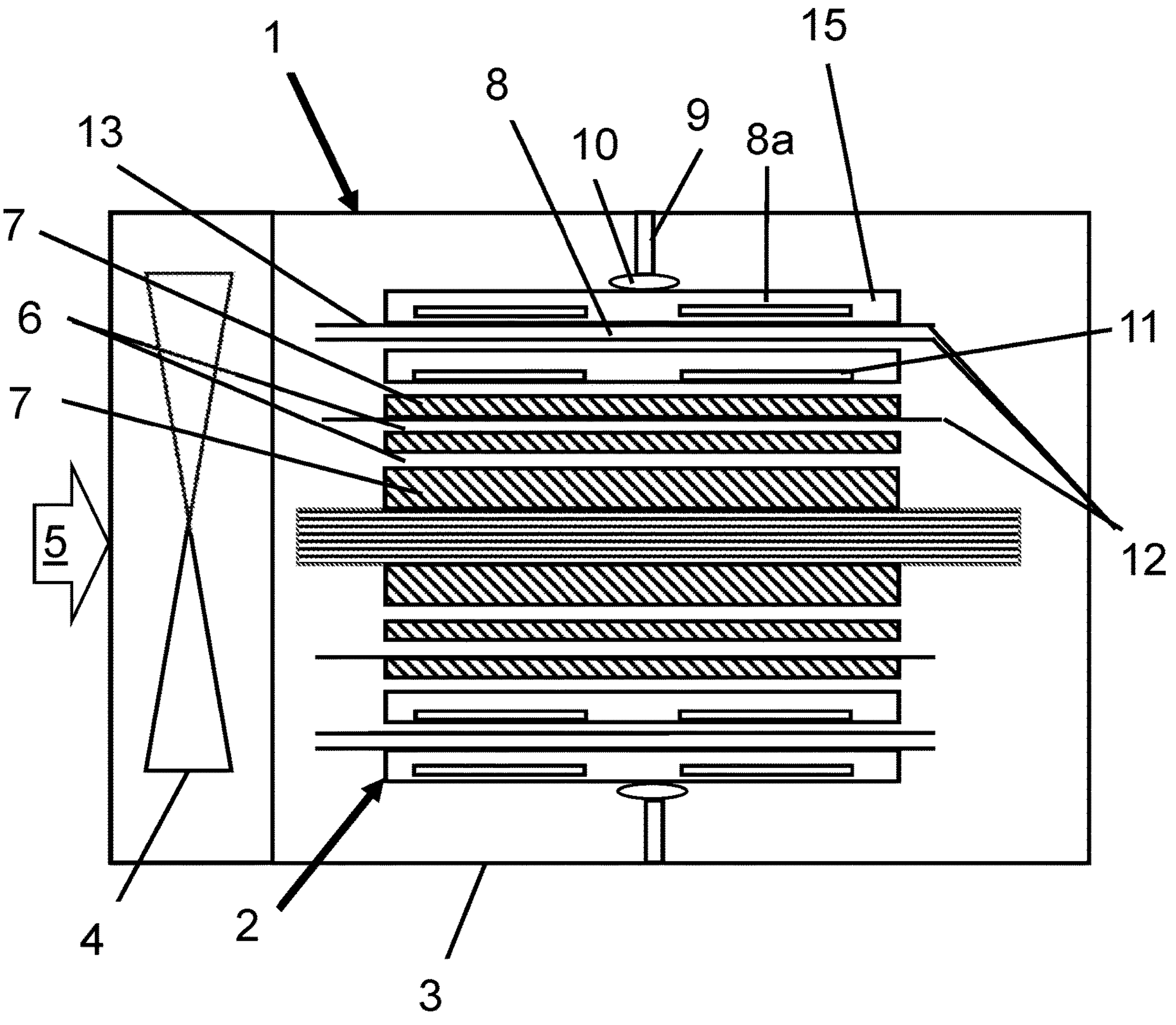
FIG. 1 schematically shows an arrangement according to the state of the art, wherein cooling by an airflow takes place using an air guidance plate, which is placed radially between an enclosure and an outer air duct, FIG. 2 schematically shows an arrangement, wherein cooling by an airflow takes place using an air guidance plate between an enclosure and a coil, wherein a part of the insulation has been shortened longitudinally, FIG. 3 schematically shows an arrangement, wherein cooling by an airflow takes place using an air guidance plate between an enclosure and a coil, where a large part of the insulation has been shortened longitudinally, and FIG. 4 schematically shows a further arrangement, wherein cooling by an airflow takes place using an air guidance plate between an enclosure and a coil, wherein a part of the insulation has been shortened longitudinally with respect to a remaining longer part of the insulation and wherein no radially oriented air gap between the air guidance plate and the longer part of the insulation exists.

FIG. 1 shows a transformer 1, comprising an arrangement to cool a coil 2 according to the state of the art. The arrangement comprises an enclosure 3, which at least partially incorporates or houses the coil 2 or several coils 2. The arrangement further comprises a device 4 to create an airflow 5 to cool the coil 2. The coil 2 comprises at least one cooling channel 6 to guide the airflow 5 through the windings 7 of the coil 2 and an outer air duct 8 lying radially inside below an outer part 8*a* of the coil.

To cool the windings 7 of the coil 2 of the transformer 1, air is guided through the windings 7. Therefore an overpressure is generated by the device 4 or fan at an air inlet area of the enclosure 3 of the transformer 1.

By this means an air flow 5 is generated to flow from the inlet towards an outlet and then through a grid into the environment. It is preferred that a large amount of air flows through the cooling channels 6 in the windings 7.

This is generally achieved by using an air guidance plate 9, which is arranged in close proximity to the coil 2. By this means a flow resistance through the cooling channels 6 becomes smaller than a flow resistance around the coil 2. This principle of the state of the art is schematically shown in FIG. 1.

This principle involves some drawbacks. In order to ensure an airflow through the cooling channels 6, which is sufficient, an overpressure has to be generated to overcome the resistance in the enclosure 3. This requires a large effort of operation and a device 4 having a high power. Such a device 4 or ventilator implicates a large dimension and therefore lots of space is required for its installation. Further lots of air gets lost while flowing through the outer air duct 8. This reduces the efficiency of cooling.

To take measures, a sealing 10 is placed onto a coil surface, on which the air guidance plate 9 is placed, so that there is no leak of airflow around the coil surface. FIG. 1 further shows, that the outer part 8*a* comprises a conductor 11 and that the coil 2 comprises barriers 13 having insulations 12.

Figure 2:
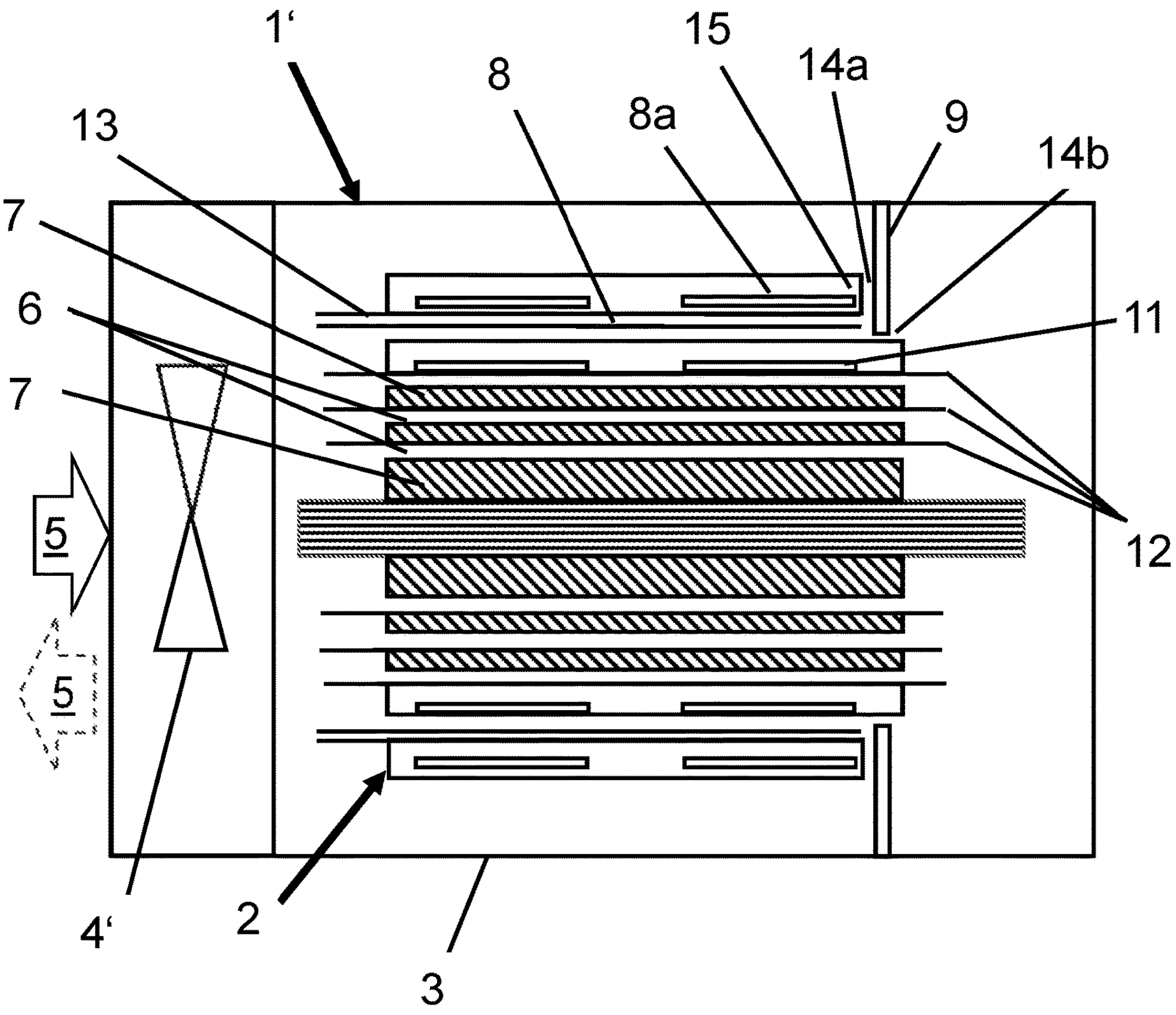
Figure 3:
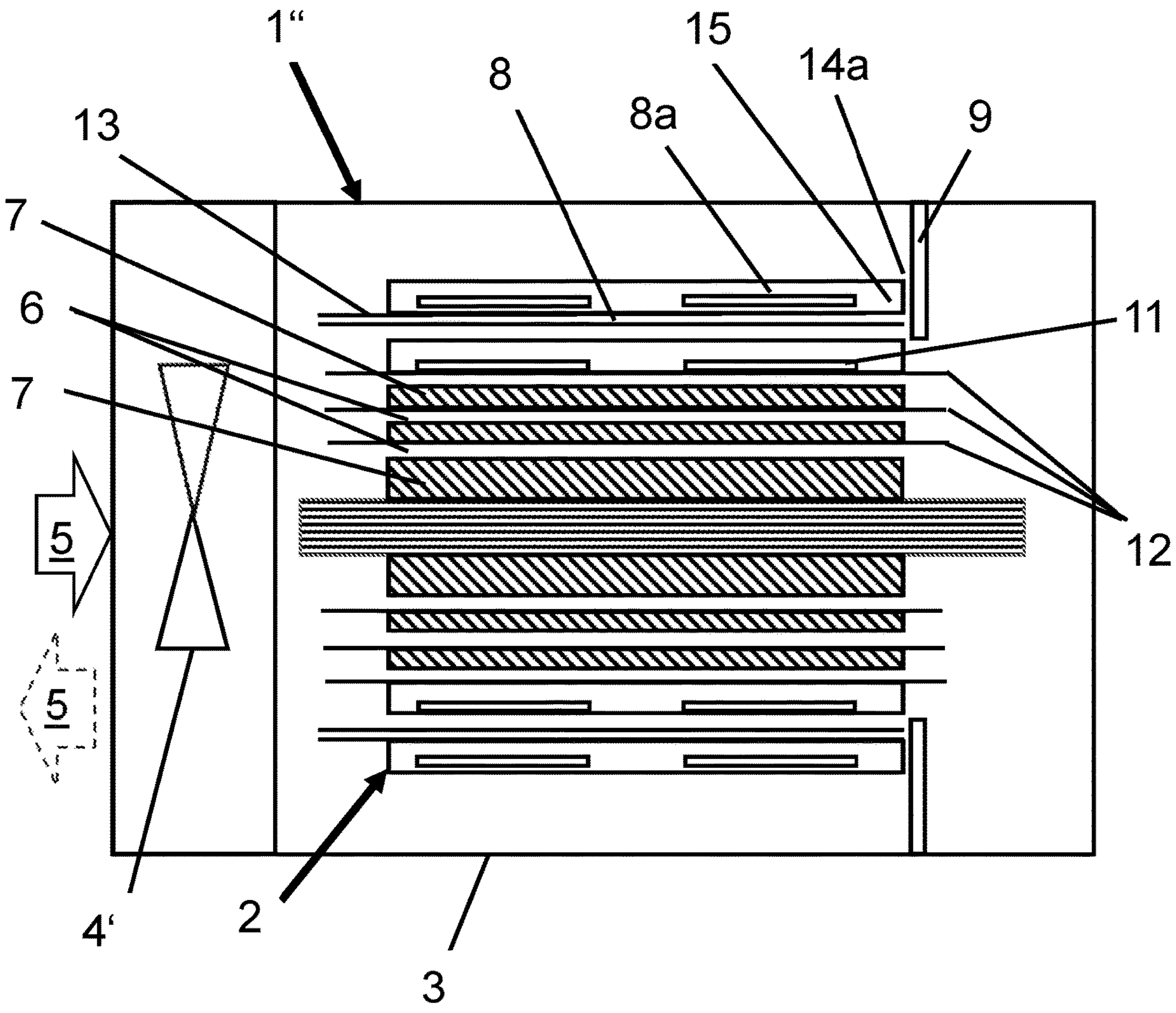

FIGS. 2 and 3 each show a transformer 1', 1", comprising an arrangement to cool a coil 2 according to the invention.

To cool the windings 7 of the coil 2 of the transformer 1, air is guided through the windings 7. Therefore an overpressure is generated by the device 4' or fan at an air inlet area of the enclosure 3 of the transformer 1. By this means an air flow 5 is generated to flow from the inlet towards an outlet and then optionally through a grid into the environment. It is preferred that a large amount of air flows through the cooling channels 6 in the windings 7.

An underpressure at an outlet, which may be generated by a fan or an air compressor at the outlet, could also work. This means that the inlet shown in FIGS. 2 and 3 also may be an outlet, which is shown by the arrow in dashed lines. Air can flow from one side to the other side of the coil. This can be reached by an overpressure or an underpressure.

The arrangement therefore comprises an enclosure 3, which at least partially incorporates or houses at least one coil 2, preferably several coils 2. The arrangement further comprises a device 4' to create an airflow 5 to cool the coil 2. The coil 2 comprises at least one cooling channel 6 to guide the airflow 5 through the windings 7 of the coil 2 and at least one outer air duct 8 lying radially inside below an outer part 8*a* of the coil. The outer part 8*a* may be an outer layer of the coil. The outer part 8*a* of the coil encircles or surrounds the windings 7.

At least one air guidance plate 9 is placed at or near one longitudinal end of the outer air duct 8 and of the coil 2 to prevent bypasses of the airflow 5 and to block at least partially the airflow 5 through and along the outer air duct 8. The air guidance plate 9 is fixed at one end or at one rim on the enclosure 3 and extends with the other end or another rim to the coil 2, namely to the longitudinal end of the outer air duct 8.

The air guidance plate 9 is placed onto the lower part of the high-voltage side of the coil 2. There is a longitudinally oriented air gap 14*a* between the air guidance plate 9 and the high-voltage side of the coil 2. There is also a radially oriented air gap 14*b* between the rim of the air guidance plate 9 and the high-voltage side of the coil 2.

FIG. 2 especially shows that a part of the insulation 15 of the coil 2, which is shown completely and not shortened in FIG. 3, is shortened to place the air guidance plate 9.

A radially inner part 15*a* of the insulation 15 is longer than a radially outer part 15*b* of the insulation 15, wherein the radially outer part 15*b* is longitudinally shortened with respect to the radially inner part 15*a*. These parts 15*a*, 15*b* or layers are shown in FIG. 4 in detail.

FIG. 3 especially shows, that a barrier overhang 12 of the coil 2 is shortened to place the air guidance plate 9, wherein the insulation 15 is not shortened.

Figure 4:
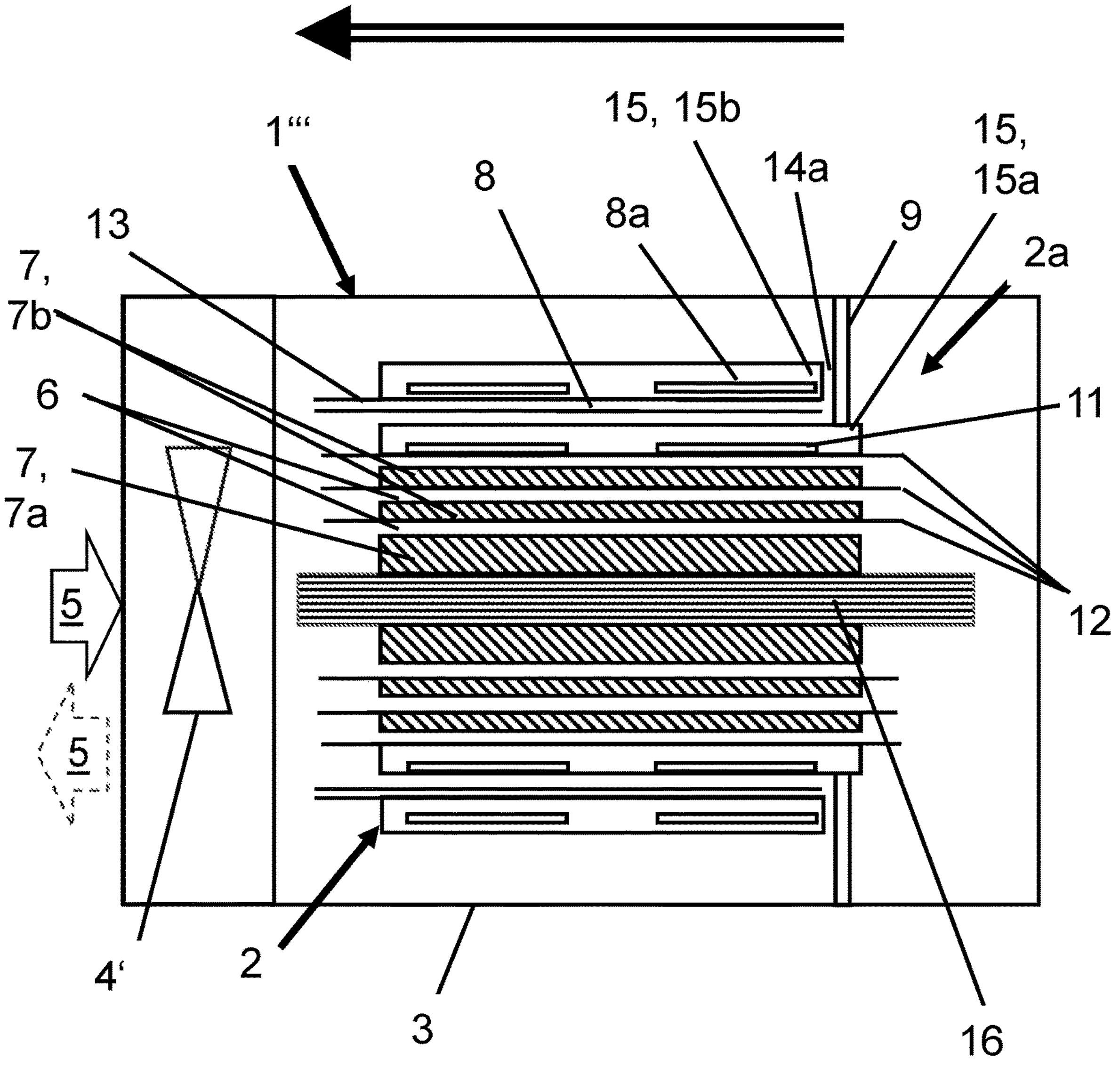

The radially inner part 15*a* of the insulation 15 which can be seen in FIG. 4 is as long as the not shortened radially outer part 15*b* of the insulation 15, but an radially outer barrier overhang 12 lying between the radially outer part 15*b* and the radially inner part 15*a* is shortened relative to at least an radially inner barrier overhang 12, which lies radially inside of the insulation 15.

The barrier overhangs 12 are also electrical insulations and usually are made of polymers. There are in FIG. 3 three barrier overhangs 12 lying radially inside with respect to the inner part 15*a* of the insulation 15 and two barrier overhangs 12 lying radially outside with respect to the inner part 15*a* of the insulation 15.

The two radially outer barrier overhangs 12 are shortened with respect to the three radially inner barrier overhangs 12, so that the air guidance plate 9 can be arranged very narrow or close to the longitudinal end of the coil 2 or of the outer air duct 8 and can block the outer air duct 8.

The outer air duct 8 lies between the radially inner part 15*a* and the radially outer part 15*b* of the insulation 15. The radially outer barrier overhangs 12 are shortened with respect to the radially inner barrier overhangs 12 on the cold side of the coil 2, which means the lower voltage side of the transformer 1".

FIGS. 2 and 3 each show a transformer 1', 1", comprising an arrangement according to the invention. The transformer 1', 1" is a dry-type transformer. The Transformer 1', 1" is part of a train or is used in a rolling stock application.

FIG. 4 as well shows a transformer 1'", comprising an arrangement according to the invention. The transformer 1'" is a dry-type transformer. The Transformer 1'" is part of a train or is used in a rolling stock application.

FIG. 4 again shows, that the air guidance plate 9 is placed at or near to the longitudinal end of the outer air duct 8 and of the coil 2 blocking at least partially the airflow 5 through the outer air duct 8, wherein at this longitudinal end a radially outer part 15*b* of the insulation 15 is shorter than the radially inner part 15*a* of the insulation 15. As well, at this longitudinal end a radially outer barrier overhang 12 is shorter than a radially inner barrier overhang 12.

The radially outer part 15*b* of the insulation 15 is shortened relative to the radially inner part 15*a* of the insulation 15, wherein the insulation 15 surrounds the cooling channels 6 and wherein the air guidance plate 9 is arranged longitudinally inside with respect to the longitudinal end of the radially inner part 15*a*.

At least one first barrier overhang 12, which lies radially outside with respect to the cooling channels 6 is shortened relative to a further barrier overhang 12, which lies radially inside with respect to the first barrier overhang 12.

The outer air duct 8 has a width of slit in the range between 30 to 40 mm and a cooling channel 6 lying between two windings 7, 7*a*, 7*b* has a width of slit in the range between 7 to 10 mm.

Between the air guidance plate 9 and the longitudinal end of the outer air duct 8 there is a longitudinally oriented air gap 14*a* having a width in the range between 10 to 30 mm. The air guidance plate 9 abuts with one end on the radially inner part 15*a* of the insulation 15 without any radially oriented air gap.

FIG. 4 in principle shows the arrangement of FIG. 2, with the addition that no radially oriented air gap 14*b* exists and wherein the air guidance plate 9 abuts on the radially inner part 15*a* of the insulation 15, which is longer than the radially outer part 15*b* of the insulation 15. The insulation 15 is made of silicone.

The radially inner part 15*a* of the insulation 15 is about 40 mm to 100 mm longer than the radially outer part 15*b* of the insulation 15, wherein the radially outer part 15*b* is longitudinally shortened with respect to the radially inner part 15*a*. These parts 15*a*, 15*b* are a kind of layers of an insulation 15 or insulation arrangement.

The air guidance plate 9 also abuts on the enclosure 3 so that no radially oriented gap exists at all. The longitudinally oriented air gap 14*a* has a width in longitudinal direction of about 20 mm.

The air guidance plate 9 is placed on the cold side of an active part of the transformers 1', 1", 1'" shown here, wherein said active part comprises the coil 2 and the core 16. All windings 7 surround this core 16.

The cold side means the lower voltage side of the active part of the transformer 1', 1", l'". The increase of voltage from right to left side is shown in FIG. 4 by the long arrow at the top of FIG. 4. This increase of voltage in direction of the arrow is also given with respect to FIGS. 2 and 3.

The device 4' or ventilator shown here can be placed on any side of this active part. The device 4' or ventilator can suck and/or blow air to create the air flow 5.

The heat sources of the described active part are the core 16, at least an LV-part 7*a* and HV-parts 7*b*. LV means low voltage and HV means high voltage. LV-part 7*a* and HV-parts 7*b* are windings 7.

The LV-part 7*a* or HV-parts 7*b* each may comprise several parts, which are separated by cooling channels 6.

A cooling channel 6 may have a width in radial direction of 7 to 10 mm. The outer air duct 8 may have a width in radial direction of 30 to 40 mm.

It is required that most of the cooling air flows though the LV-parts 7*a* and HV-parts 7*b*. The outermost air duct 8 or air ducts between an outer part 8*a* and those HV-parts 7*b* is a big gap, which allows a lot of air to go through.

Therefore, this big gap reduces the cooling effect for the LV-part 7*a* and the HV-parts 7*b*. The invention is to block this big air gap between an outer part 8*a* and HV-parts 7*b*.

| Reference numbers | |
|---|---|
| 1, 1', 1" | Transformer |
| 2 | Coil of 1, 1' |
| 3 | Enclosure of 1, 1'First line voltage supply to consumers of electricity |
| 4, 4' | Device or fan |
| 5 | Airflow |
| 6 | Cooling channel of 7 |
| 7 | Windings of 2 |
| 7a | LV-part |
| 7b | HV-part |
| 8 | Outer air duct of 2 |
| 8a | Outer part of 2 |
| 9 | Air guidance plate |
| 10 | Sealing |
| 11 | Conductor of 8 |
| 12 | Barrier overhang |
| 13 | Barrier |
| 14a | Air gap, longitudinally oriented |
| 14b | Air gap, radially oriented |
| 15 | Insulation of 8 |
| 15a | Radially inner part of 15 |
| 15b | Radially outer part of 15 |
| 16 | Core of 2 |

The invention claimed is:

1. Arrangement to cool a coil, comprising:

an enclosure, which at least partially incorporates or houses the coil:

a device to create an airflow to cool the coil, the coil comprising:

at least one cooling channel to guide the airflow through the windings of the coil; and an outer air duct lying radially in the outer circumference area of the coil or lying radially inside below an outer part of the coil;

an insulation surrounding the coil, the insulation comprising:

a radially inner part; and a radially outer part being shorter than the radially inner part in an axial direction of the coil at a lower part of the coil radially inside the outer air duct;

a barrier overhang surrounding the coil, the barrier overhang comprising:

a radially inner barrier overhang; and a radially outer barrier overhang being shorter than the radially inner barrier overhang in the axial direction at the lower part of the coil radially inside the outer air duct; and an air guidance plate placed longitudinally between an end of the radially inner part and an end of the radially outer part of the insulation, and longitudinally between an end of the radially inner barrier overhang and an end of the radially outer barrier overhang of the barrier overhang to block at least partially the airflow through the outer air duct.

2. Arrangement according to claim 1, wherein the outer air duct has a width of slit in the range between 30 to 40 mm and wherein a cooling channel lying between two windings has a width of slit in the range between 7 to 10 mm.

3. Arrangement according to claim 1, wherein a longitudinally oriented air gap having a width in the range between 10 to 30 mm is between the air guidance plate and the one longitudinal end of the outer air duct.

4. Arrangement according to claim 2, wherein the air guidance plate abuts with one end on the radially inner part of the insulation.

5. Arrangement according to claim 1, wherein the air guidance plate is fixed at one end or at one rim on the enclosure and extends with the other end or another rim to the coil.

6. Arrangement according to claim 1, wherein the air guidance plate is placed onto the lower part of a high-voltage side of the coil.

7. Arrangement according to claim 1, further comprising at least one air gap between the air guidance plate and a high-voltage side of the coil.

8. Transformer, comprising an arrangement according to claim 1.

9. Transformer according to claim 8, wherein the transformer is a dry-type transformer.

10. A train comprising a transformer according to claim 8.

* * * * *